US012682739B2

(12) United States Patent
Jeon et al.

(10) Patent No.: US 12,682,739 B2
(45) Date of Patent: Jul. 14, 2026

(54) VEHICLE CONTROL METHOD AND VEHICLE CONTROL DEVICE

(71) Applicants:HYUNDAI MOTOR COMPANY, Seoul (KR); KIA CORPORATION, Seoul (KR)

(72) Inventors: Seul Ki Jeon, Hwaseong-si (KR); Hui Won Shin, Hwaseong-si (KR); Eung Hwan Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 306 days.

(21) Appl. No.: 18/371,122

(22) Filed: Sep. 21, 2023

(65) Prior Publication Data

US 2024/0212471 A1     Jun. 27, 2024

(30) Foreign Application Priority Data

Dec. 27, 2022     (KR) ........................ 10-2022-0186181

(51) Int. Cl.
*G08B 21/02* (2006.01)
*B60Q 5/00* (2006.01)
*G06V 20/59* (2022.01)

(52) U.S. Cl.
CPC ............. *G08B 21/02* (2013.01); *B60Q 5/005* (2013.01); *G06V 20/59* (2022.01)

(58) Field of Classification Search
CPC .... G08B 21/02; G08B 21/24; G08B 21/0233; G08B 21/22; B60Q 5/005; G06V 20/59;

B60W 50/14; B60W 40/08; B60W 2040/0881; B60W 2050/143; B60R 25/1001; B60R 25/34
See application file for complete search history.

(56) References Cited

U.S. PATENT DOCUMENTS

| | | | |
|---|---|---|---|
| 7,772,967 | B2 | 8/2010 | Tanaka et al. |
| 9,963,045 | B2 | 5/2018 | Fujii et al. |
| 11,231,496 | B2 | 1/2022 | Choi et al. |
| 2007/0193811 | A1 | 8/2007 | Breed et al. |
| 2009/0051511 | A1 | 2/2009 | Tanaka et al. |

(Continued)

FOREIGN PATENT DOCUMENTS

| | | |
|---|---|---|
| CN | 109927603 A | 6/2019 |
| EP | 4068235 A1 | 10/2022 |

(Continued)

OTHER PUBLICATIONS

Extended European Search Report cited in corresponding Eurpean patent application No. 23198787.6; Mar. 11, 2024; 9 pp.

*Primary Examiner* — Brian Wilson
(74) *Attorney, Agent, or Firm* — Lempia Summerfield Katz LLC

(57) ABSTRACT

A vehicle control method includes entering an initial warning state based on a door being locked in a pre-warning state to output a first warning alarm for a first time interval after an ignition of a vehicle is turned off, and entering an escalation warning state based on end of the first warning alarm and outputting a second warning alarm for a second time interval, wherein the first and second warning alarms are output based on detection of a passenger in the vehicle.

16 Claims, 11 Drawing Sheets

(56)          References Cited

U.S. PATENT DOCUMENTS

| | | | |
|---|---|---|---|
| 2011/0183650 A1* | 7/2011 | McKee | H04M 1/724 |
| | | | 455/567 |
| 2019/0184853 A1 | 6/2019 | Thomas et al. | |
| 2019/0232818 A1* | 8/2019 | Gangu | B60N 2/267 |
| 2020/0017066 A1 | 1/2020 | Goru et al. | |
| 2021/0096236 A1 | 4/2021 | Choi et al. | |
| 2022/0097636 A1* | 3/2022 | Beach | B60N 2/0026 |
| 2022/0180726 A1 | 6/2022 | Bender | |
| 2023/0138431 A1* | 5/2023 | Kuno | G06F 3/017 |
| | | | 340/426.34 |

FOREIGN PATENT DOCUMENTS

| | | |
|---|---|---|
| JP | 4501737 B2 | 7/2010 |
| KR | 101964135 B1 | 4/2019 |
| KR | 20210020501 A | 2/2021 |
| WO | 2018158605 A1 | 9/2018 |

* cited by examiner

VEHICLE CONTROL METHOD AND VEHICLE CONTROL DEVICE

CROSS-REFERENCE TO RELATED APPLICATION

This application claims the benefit of and priority to Korean Patent Application No. 10-2022-0186181, filed in the Korean Intellectual Property Office on Dec. 27, 2022, the entire contents of which are incorporated herein by reference.

TECHNICAL FIELD

The present disclosure relates to a vehicle warning alarm, and more particularly, to a technique for adaptively controlling a warning alarm according to occurrence of a level-wise warning event in a vehicle control device that detects the presence of a passenger in a vehicle based on the vehicle being locked after the ignition is turned off and outputs a warning alarm in a level-wise manner.

BACKGROUND

With the development of vehicle technology, services for user safety and convenience are expanding. Among these vehicle safety services, research into a system that detects the presence of a remaining passenger in a vehicle when a driver gets out of the vehicle after vehicle ignition is turned off and outputs a warning alarm according to a detection result is being actively researched.

In particular, when the driver leaves the vehicle while an infant or young child remains inside the vehicle, a safety accident of the infant or young child may occur, resulting in necessity to effectively inform the driver or surroundings of relevant events.

Conventionally, a child seat mounted in a vehicle is equipped with a sensor for detecting the movement of an infant, and when the movement of the infant is detected after the driver has left the vehicle, relevant information is transmitted to the corresponding driver's terminal.

Under the current regulations for child boarding detection systems, waring levels are classified into an Initial Warning (IW) level and an Escalation Warning (EW) level, but it is completely undefined conditions transition between warning levels occurs.

The statements in this BACKGROUND section merely provide background information related to the present disclosure and may not constitute prior art.

SUMMARY

The present disclosure has been made to solve the above-mentioned problems occurring in the prior art while advantages achieved by the prior art are maintained intact.

An aspect of the present disclosure provides a vehicle control method and a vehicle control device capable of efficiently controlling a warning alarm in a level-wise manner.

An aspect of the present disclosure provides a vehicle control method and a vehicle control device capable of adaptively transitioning between warning alarm levels according to a type of an event occurring.

An aspect of the present disclosure provides provide a vehicle control method and a vehicle control device, which define detailed conditions for warning state transition in a vehicle control device for detecting a remaining occupant in a vehicle and output a warning alarm in a level-wise manner when a driver leaves the vehicle after vehicle ignition is turned off.

The technical problems to be solved by the present disclosure are not limited to the aforementioned problems, and any other technical problems not mentioned herein should be clearly understood from the following description by those having ordinary skill in the art to which the present disclosure pertains.

According to an aspect of the present disclosure, a vehicle control method includes entering an initial warning state based on a door being locked in a pre-warning state to output a first warning alarm for a first time interval after an ignition of a vehicle is turned off. The vehicle control method further includes entering an escalation warning state based on the end of the first warning alarm and outputting a second warning alarm for a second time interval. In particular, the first and second warning alarms may be output based on detection of a passenger in the vehicle.

According to an embodiment, the second time interval may be longer than the first time interval.

According to an embodiment, the first time interval may include a first active interval in which the first warning alarm is repeatedly output a first number of times at first intervals of time and a first standby interval for waiting for a second time after the first active interval.

According to an embodiment, the second time interval may include a plurality of cycles, the cycle may include a second active interval in which the second warning alarm is repeatedly output a second number of times at the first intervals of time, and a second standby interval for waiting for a third time after the second active interval, the second number of times may be greater than the first number of times, and the first standby interval may be longer than the second standby interval.

According to an embodiment, the vehicle control method may further include entering the escalation warning state after the first standby interval.

According to an embodiment, each of the initial warning state and the escalation warning state may include a detection interval which is a time for detecting presence or absence of the passenger in the vehicle using a sensor provided in the vehicle.

According to an embodiment, the vehicle control method may further include transitioning to the initial warning state based on occurrence of a first event in the escalation warning state. The first event may include at least one of a first alarm event according to error release after a sensor error is detected, a second alarm event according to unlock of the door, a third alarm event according to opening or closing of a tailgate of the vehicle, a fourth alarm event according to opening or closing of a trunk or frunk of the vehicle, or a fifth alarm event according to a transition from a User Setting Menu (USM) OFF state to a USM ON state.

According to an embodiment, the vehicle control method may further include reentering the initial warning state to re-detect the passenger in the vehicle based on occurrence of a second event in the initial warning state. The second event may include the first to fifth alarm events, a sixth alarm event according to remote ignition end, a seventh alarm event according to end of an alarm flasher when the door is locked again, or any combination thereof.

According to an embodiment, the vehicle control method may further include reentering the escalation warning state to re-detect the passenger in the vehicle based on occurrence of a third event in the escalation warning state. The third event may include an alarm event according to remote ignition end, an alarm event according to upper flasher end, an alarm event according to end of an alarm flasher when the door is locked again, or any combination thereof.

According to an embodiment, the vehicle control method may further include counting the cycles in the escalation warning state and initializing counting for the cycles based on transition from the escalation warning state to the initial warning state or re-entry into the escalation warning state.

According to an aspect of the present disclosure, a vehicle control device includes a domain controller that detects operation for a door switch, a passenger detection controller that detects presence or absence of a passenger in a vehicle based on sensing information received from a sensor, and a warning alarm controller that controls a level-wise warning alarm when the passenger is detected in the vehicle, wherein the warning alarm controller may enter an initial warning state based on a door being locked in a pre-warning state to output a first warning alarm for a first time interval after the vehicle ignition is turned off, enter an escalation warning state based on end of the first warning alarm, and output a second warning alarm for a second time interval, and the first and second warning alarms may be output based on detection of the passenger in the vehicle.

According to an embodiment, the second time interval may be longer than the first time interval.

According to an embodiment, the first time interval may include a first active interval in which the first warning alarm is repeatedly output a first number of times at first intervals of time, and a first standby interval for waiting for a second time after the first active interval.

According to an embodiment, the second time interval may include a plurality of cycles. The cycle may include a second active interval in which the second warning alarm is repeatedly output a second number of times at the first intervals of time, and a second standby interval for waiting for a third time after the second active interval, the second number of times may be greater than the first number of times, and the first standby interval may be longer than the second standby interval.

According to an embodiment, the warning alarm controller may enter the escalation warning state after the first standby interval.

According to an embodiment, each of the initial warning state and the escalation warning state may include a detection interval which is a time for detecting presence or absence of the passenger in the vehicle using the sensor, and the sensor may include at least one of a laser sensor, an infrared sensor, a camera sensor, or a pressure sensor.

According to an embodiment, the warning alarm controller may transition to the initial warning state based on occurrence a first event in the escalation warning state. The first event may include at least one of a first alarm event according to error release after a sensor error is detected; a second alarm event according to unlock of the door, a third alarm event according to opening or closing of a tailgate of the vehicle, a fourth alarm event according to opening or closing of a trunk or frunk of the vehicle, a fifth alarm event according to a transition from a User Setting Menu (USM) OFF state to a USM ON state, or any combination thereof.

According to an embodiment, the warning alarm controller may reenter the initial warning state to re-detect the passenger in the vehicle based on occurrence of a second event in the initial warning state. The second event may include at least one of the first to fifth alarm event, a sixth alarm event according to remote ignition end, a seventh alarm event related to end of an alarm flasher when the door is locked again, or any combination thereof.

According to an embodiment, the warning alarm controller may reenter the escalation warning state to allow the passenger detection controller to re-detect the passenger in the vehicle based on occurrence of a third event in the escalation warning state, and the third event may include at least one of an alarm event according to remote ignition end, an alarm event according to upper flasher end, an alarm event according to end of an alarm flasher when the door is locked again, or any combination thereof.

According to an embodiment, the warning alarm controller may count the cycles in the escalation warning state and initialize counting for the cycles based on transition from the escalation warning state to the initial warning state or re-entry into the escalation warning state.

BRIEF DESCRIPTION OF THE DRAWINGS

The above and other objects, features and advantages of the present disclosure should be more apparent from the following detailed description taken in conjunction with the accompanying drawings.

DETAILED DESCRIPTION

Figure 1:
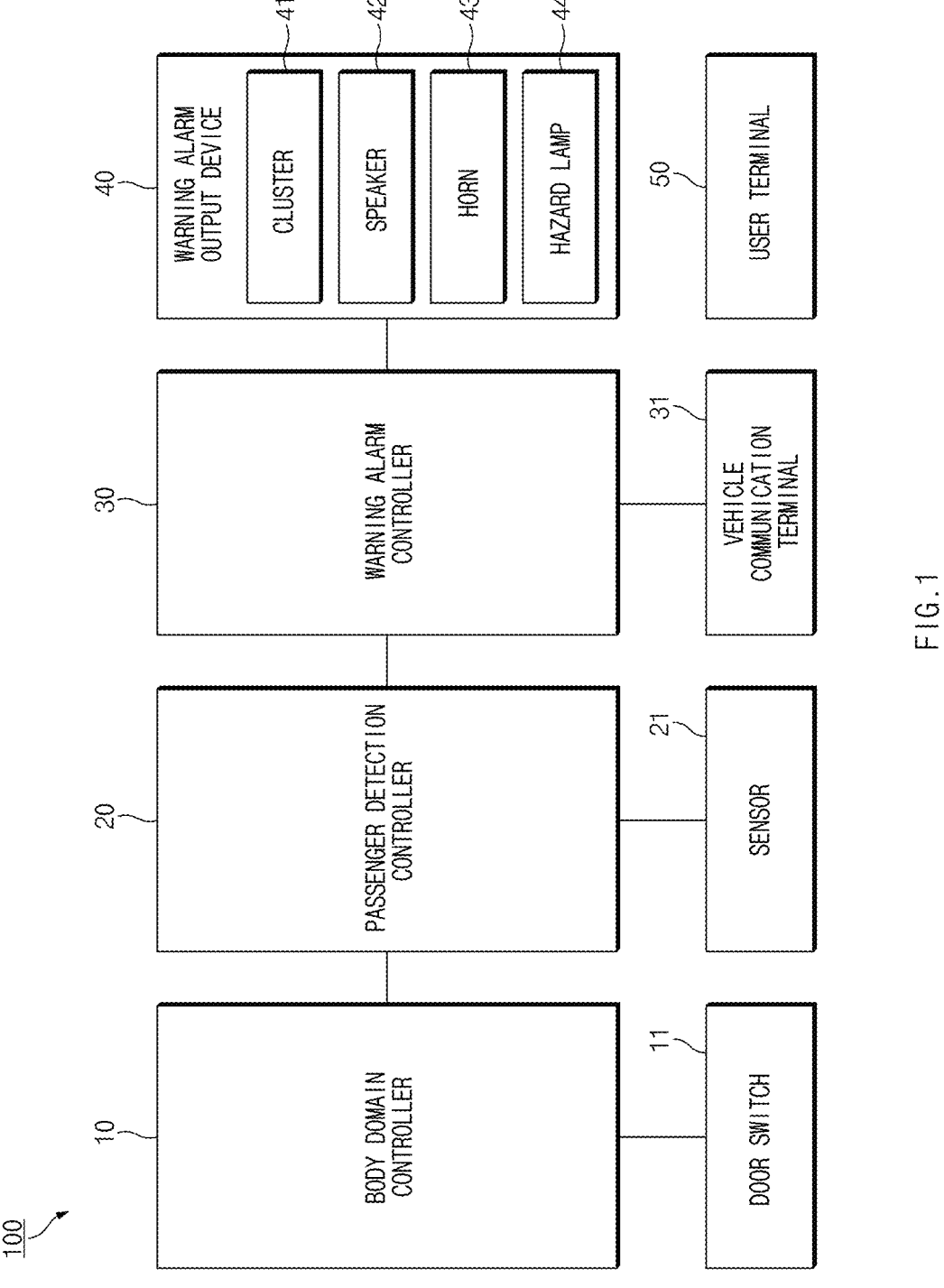
FIG. 1 is a diagram for describing a configuration of a vehicle control device according to an embodiment of the present disclosure.

Hereinafter, some embodiments of the present disclosure are described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions has been ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those having ordinary skill in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

When a component, device, element, or the like of the present disclosure is described as having a purpose or performing an operation, function, or the like, the component, device, or element should be considered herein as being "configured to" meet that purpose or to perform that operation or function.

Hereinafter, embodiments of the present disclosure are described in detail with reference to FIGS. 1 to 11.

FIG. 1 is a diagram for describing a configuration of a vehicle control device according to an embodiment of the present disclosure.

Referring to FIG. 1, a vehicle control device 100 may include a body domain controller 10 that controls a door switch 11, a passenger detection controller 20 that detects whether there is a passenger in a vehicle through a sensor 21, and a warning alarm controller 30 that performs control to output a warning alarm for each warning level through a warning alarm output device 40 according to a result of detection of whether there is a passenger.

The body domain controller 10 may detect opening/closing operations of various doors provided in the vehicle, receive a door lock/unlock command from a smart key or a user terminal 50, and control the door switch 11. According to an embodiment, the doors may include not only front seat doors including a driver's seat door and a front passenger seat door but also rear seat doors, but the embodiment is merely one example, and doors according to another embodiment may further include a tailgate, a trunk, a plank, and the like.

The passenger detection controller 20 may detect whether or not a passenger is inside the vehicle by operating the sensor 21 when the driver's seat door is opened and then closed after vehicle ignition (IGN) is turned off.

According to an embodiment, the sensor 21 may be a laser sensor, but the embodiment is merely one example. the sensor 21 may further include an infrared sensor, a camera sensor, a pressure sensor, or any combination thereof. The passenger detection controller 20 may not only detect movement in the vehicle using a laser sensor to detect the presence or absence of a passenger (e.g., including an infant, an elderly, and a companion animal) but also detect whether the heart of a passenger is beating. In addition, the passenger detection controller 20 may detect the presence or absence of a creature in the vehicle through an infrared sensor, and recognize and track an object through a camera sensor to detect the presence or absence of a passenger in the vehicle (for example, an infant, an elderly, a companion animal, or the like). In addition, the passenger detection controller 20 may detect the presence or absence of an occupant in the vehicle through a pressure sensor provided on one side of a vehicle seat.

The warning alarm controller 30 may control the output of a predetermined warning alarm for each warning level based on a result of detection of whether there is a passenger, which is received from the passenger detection controller 20.

The warning alarm generated by the warning alarm controller 30 according to the embodiment may be output through various warning alarm devices provided in the vehicle according to warning alarm levels. For example, the warning alarm device may include a cluster 41, a speaker 42, a horn 43, various hazard lamps 44, or any combination thereof, but is not limited thereto.

According to another embodiment, the warning alarm controller 30 may transmit a warning alarm message to the user terminal 50 through a vehicle communication terminal 31. For example, the warning alarm message may be in the form of a text message, but is merely one example. According to another embodiment, the warning alarm message may include a moving image or still image captured by a camera, which shows the condition of a passenger in the vehicle.

According to the embodiment, the passenger detection controller 20 may perform an operation for detecting a passenger in the vehicle when it is identified that a door is locked after the driver's seat door has been opened and then closed based on a signal from the body domain controller 10 after vehicle ignition (IGN) is turned off.

When a passenger is detected in the vehicle using the sensor 21 provided, the passenger detection controller 20 may transmit a predetermined control signal indicating that a passenger has been detected—for example, a passenger detection result signal—to the warning alarm controller 30.

The warning alarm controller 30 may enter an initial warning (IW) state based on the detection of a passenger in the vehicle to perform control to output an initial warning alarm. When the initial warning alarm has been ended, the warning alarm controller 30 may enter an escalation warning state to perform control to output an escalation warning alarm.

When the escalation warning alarm has been ended, the warning alarm controller 30 may shut down the system and enter a sleep state.

The vehicle control device 100 according to the embodiment may adaptively transition the warning alarm state according to the detected event.

For example, when a first event occurs in the initial warning state, the vehicle control device 100 may re-enter the initial warning state.

As another example, when a second event occurs in the escalation warning state, the vehicle control device 100 may return to the initial warning state.

As another example, when a third event occurs in the escalation warning state, the vehicle control device 100 may re-enter the escalation warning state again.

Detailed operations and types of first to third events in the initial warning state and the escalation warning state are described in detail through drawings to be described later.

Figure 2:
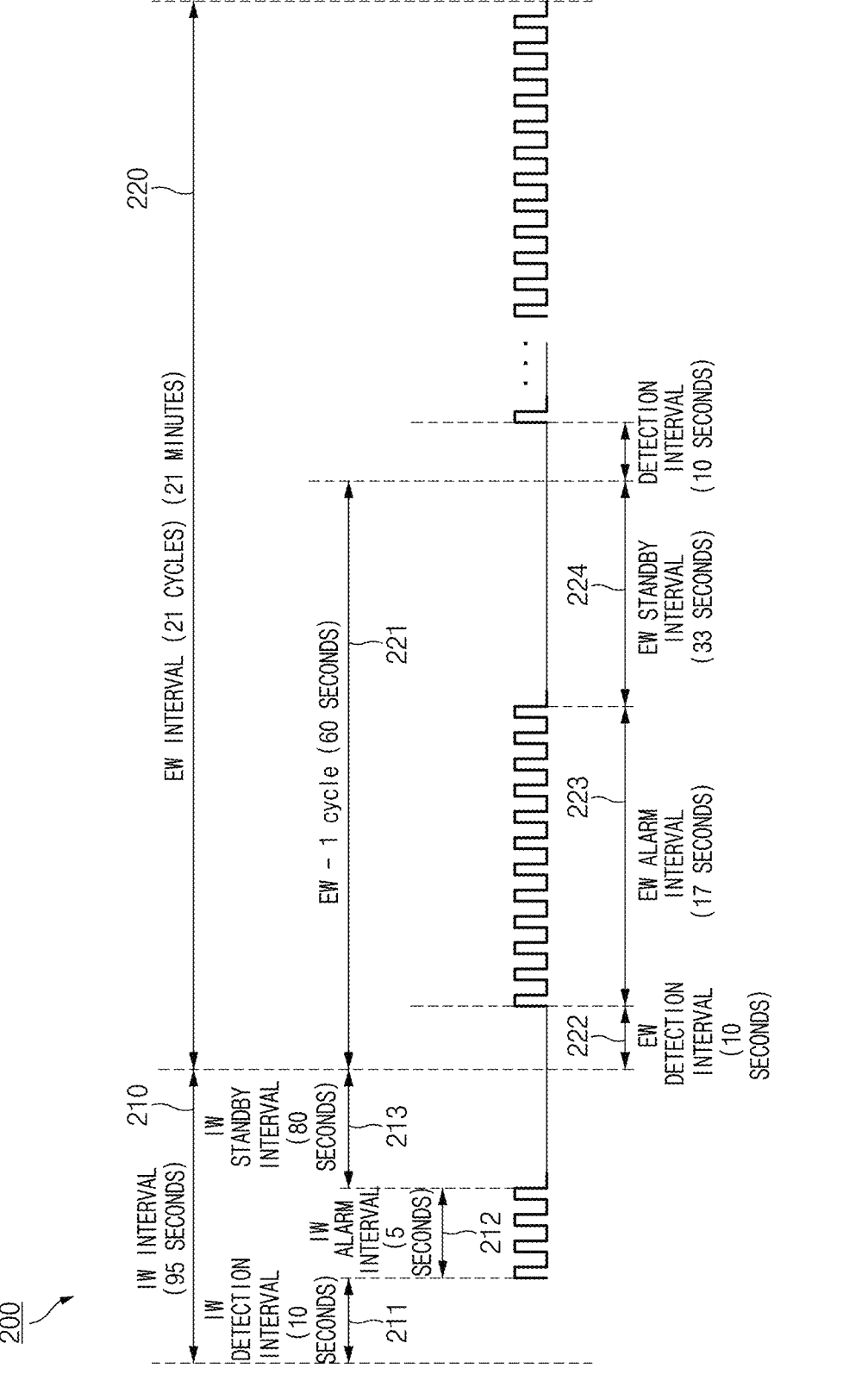
FIG. 2 is a diagram for describing a time-series structure of warning alarm levels according to an embodiment of the present disclosure.

FIG. 2 is a diagram for describing a time-series structure of level-wise warning alarms according to an embodiment of the present disclosure.

Referring to FIG. 2, an entire warning interval 200 may be largely divided into an initial warning interval 210 and an escalation warning interval 220.

The initial warning interval 210 may include an IW detection interval 211, an IW alarm interval 212, and an IW standby interval 213.

As shown in FIG. 2, the IW detection interval 211 may be an interval of 10 seconds, the IW alarm interval 212 may be an interval of 5 seconds, and the IW standby interval 213 may be an interval of 80 seconds, but this is only one embodiment. At least one of the IW detection interval 211, the IW alarm interval 212, or the IW standby interval 213 may also be designed to have a different period of time from the example of FIG. 2 according to the design of those having ordinary skill in the art and the type and detection performance of a sensor used.

The escalation warning interval 220 may include a plurality of cycles. For example, the length of each of the cycles constituting the escalation warning interval 220 may be 1 minute, the total number of cycles of the escalation warning interval 220 may be 21, and the total length of the escalation warning interval may be 20 minutes and 17 seconds. This is merely one example, and the time length of each cycle and the total number of cycles may be applied differently according to designs by those having ordinary skill in the art.

As shown in FIG. 2, an EW detection interval 222, an EW alarm interval 223, and an EW standby interval 224 may be respectively defined as 10 seconds, 17 seconds, and 33 seconds, but this is only one embodiment. The EW detection interval 222, the EW alarm interval 223, the EW standby interval 224, or any combination thereof may also be designed to have a different length of time according to the design of those having ordinary skill in the art and the type and performance of a sensor.

As an example, the IW detection interval 211 and the EW detection interval 222 may have the same length of time, but this is merely one example. The IW detection interval 211 and the EW detection interval 222 may have different lengths of time when there is a difference between the IW detection interval 211 and the EW detection interval 222 in the type and/or number of sensors used to determine whether a passenger exists in a vehicle. The vehicle sensor may be implemented to detect the presence or absence of a passenger in the vehicle in the IW detection interval 211 and the EW detection interval 222.

The IW alarm interval 212 and the EW alarm interval 223 may be implemented such that a warning alarm is repeatedly turned on/off a predetermined number of times during a corresponding alarm interval. For example, in the IW alarm interval 212, an ON interval of 0.5 seconds and an OFF interval of 1.0 seconds are iterated 4 times and, in the EW alarm interval 223, an ON interval of 0.5 seconds and an OFF interval of 1.0 seconds are iterated 12 times. This is merely one embodiment, and the number of iterations s of ON/OFF intervals in the alarm interval may vary depending on the design of those having ordinary skill in the art.

Figure 3:
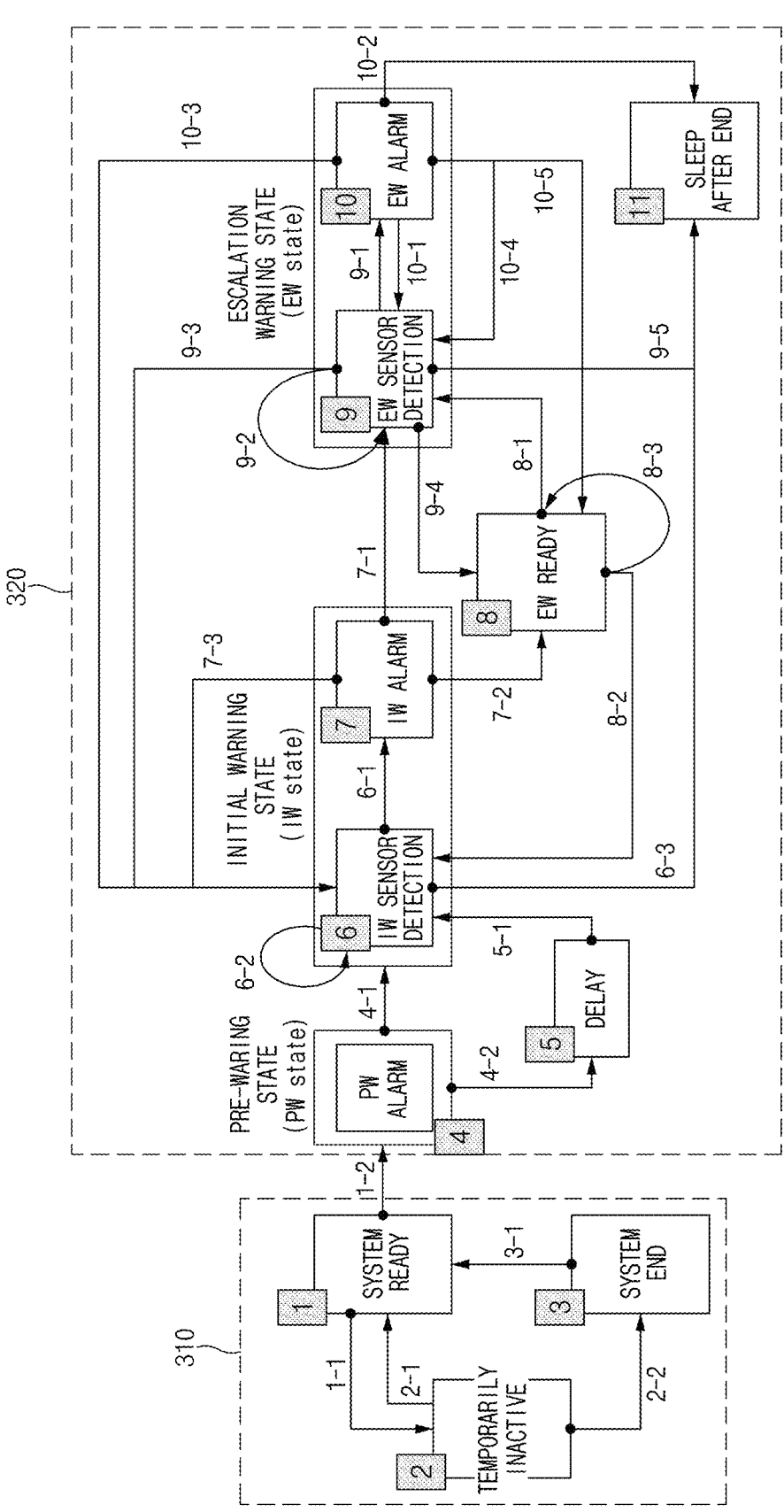
FIG. 3 is a diagram for describing a warning alarm state transition of a vehicle control device according to an embodiment of the present disclosure.

FIG. 3 is a diagram for describing a warning alarm state transition of a vehicle control device according to an embodiment of the present disclosure.

Referring to reference numeral 310, when a User Setting Menu (USM) is turned off (1-1) in a system ready state, the vehicle control device 100 may enter a temporary inactive state and when the vehicle ignition is turned Off, the vehicle control device 100 may transition to a system OFF state (2-2). The vehicle control device 100 may transition to the system ready state when the USM is turned on in the temporarily inactive state (2-1).

The vehicle control device 100 may transition to the system ready state when the vehicle ignition (IGN) is turned on and a driving speed of the vehicle is greater than a certain speed (e.g., 5 km/h) in the system OFF state (3-1).

Hereinafter, referring to reference numeral 320, a state transition process of level-wise warning alarms is described in detail.

The level-wise warning alarm state of the vehicle control device 100 may largely include a pre-warning (PW) state, an initial warning state (IW state), and an escalation warning state (EW state).

When vehicle ignition (IGN) is turned off and a driver's seat door is opened (1-2), the vehicle control device 100 may enter a pre-warning state and output a PW warning. For example, the PW warning may be displayed on a cluster, but this is merely one embodiment, and may be displayed through other output devices, such as a speaker, horn, or user terminal.

The vehicle control device 100 may transition to an initial warning state when a vehicle door is locked in the pre-warning state (4-1).

The vehicle control device that has entered the initial warning state may detect the presence or absence of a passenger using a provided sensor—i.e., perform an IW sensor detection operation—and when a passenger in the vehicle is detected (6-1), output an initial warning alarm.

The vehicle control device 100 may enter an escalation warning ready state when the initial warning alarm is ended or the door is unlocked (7-2). The vehicle control device 100 may enter an escalation warning state after the vehicle control device 100 has waited for the IW standby interval 213 in the escalation warning ready state. In addition, the vehicle control device 100 may enter the escalation warning state immediately without entering the escalation warning ready state after vehicle ignition (IGN) has been remotely turned off in the escalation warning ready state, after an upper flasher is ended or after an alarm flasher is ended when the door lock is re-entered (7-1).

The vehicle control device 100 may re-enter the escalation warning ready state when the door is unlocked in the escalation warning ready state (8-3).

The vehicle control device 100, which has entered the escalation warning state, may detect the presence or absence of a passenger in the vehicle during an EW sensor detection interval. When a passenger is detected (9-1), the vehicle control device 100 may output an EW warning alarm during the EW alarm interval.

When the EW warning alarm is finally ended, the vehicle control device 100 may end warning alarm output and enter a sleep mode (S10-2).

When no passenger is detected for a certain period of time in the IW sensor detection phase or the EW sensor detection phase (for example, when no passenger is detected for 10 minutes), the vehicle control device 100 may end the current operation and enter the sleep mode (6-3 and 9-5).

The vehicle control device 100 may transition to an escalation warning ready state when a door is unlocked during detection by an EW sensor or output of the EW warning alarm (9-4 and 10-5).

The vehicle control device 100 may transition from an escalation warning state and an initial warning state to an initial warning state when a first event to be described later is detected.

For example, the first event may include an alarm output event according to the transition from USM OFF to USM ON, an ARMHOLD release event according to opening/closing of a trunk/frunk, an alarm event according to opening/closing of a door/tailgate, an alarm event according to sensor error release, or any combination thereof.

The vehicle control device 100 may transition to the initial warning state based on occurrence of any one of the above-described first events.

The vehicle control device 100 may re-enter the escalation warning state when a second event to be described later is detected in the escalation warning state.

For example, the second event may include a remote ignition end event, an upper flasher end event, and an alarm flasher end event according to re-entering of the door lock.

The vehicle control device 100 may re-enter the EW sensor detection phase when remote ignition is ended during detection by the EW sensor, the upper flasher is ended or the alarm flasher is ended when the door lock is re-entered (9-2).

The vehicle control device 100 may re-enter the EW sensor detection phase when remote ignition is ended during EW warning alarm, the upper flasher is ended or the alarm flasher is ended in re-entering the door lock (10-4).

Figure 4:
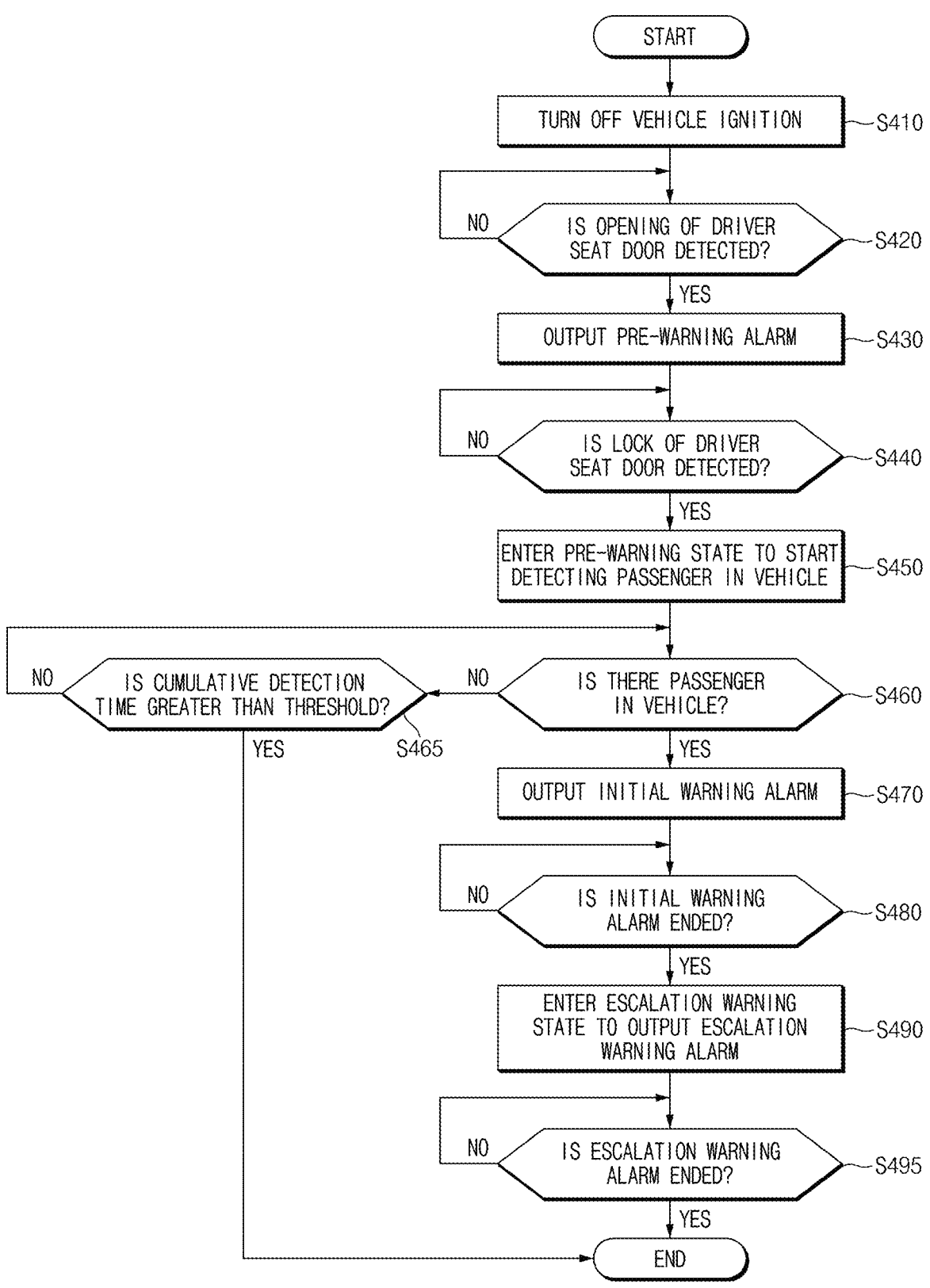
FIG. 4 is a flowchart illustrating a level-wise warning alarm control method in a vehicle control device according to an embodiment of the present disclosure.

FIG. 4 is a flowchart illustrating a level-wise warning alarm control method in a vehicle control device according to an embodiment of the present disclosure.

The vehicle control device 100 may perform control to output a pre-warning alarm when an opening of a driver's seat door is detected after vehicle ignition is turned off (in operations S410 to S430).

The vehicle control device 100 may enter an initial warning state and perform an operation for detecting a passenger in a vehicle based on detection of locking of the driver's seat door during the output of the pre-warning alarm (in operations S440-S450). In this case, the vehicle control device 100 may calculate a time required for detecting a passenger in the vehicle i.e., a cumulative detection time in the initial warning state.

The vehicle control device 100 may determine whether or not there is a passenger in the vehicle using a provided sensor (in an operation S460).

The vehicle control device 100 may compare the cumulative detection time with a predetermined threshold to determine whether the cumulative detection time is greater than the threshold (in an operation S465).

As a result of the determination, when the cumulative detection time is greater than the threshold, the vehicle control device 100 may shut down a system and enter a sleep mode.

When it is determined that there is a passenger in the vehicle in the initial warning state, the vehicle control device 100 may perform control to output an initial warning alarm (in an operation S470).

When the initial warning alarm is normally ended, the vehicle control device 100 may enter an escalation warning state and perform control to output an escalation warning alarm (in operations S480 to S490).

When the escalation warning alarm is normally ended, the vehicle control device 100 may shut down the system and enter a sleep mode (in an operation S495). In this case, the vehicle control device 100 may count the number of cycles in which the escalation warning alarm is output, and determine that the escalation warning alarm is normally ended based on the fact that the accumulated number of cycles reaches a predetermined reference value.

Figure 5:
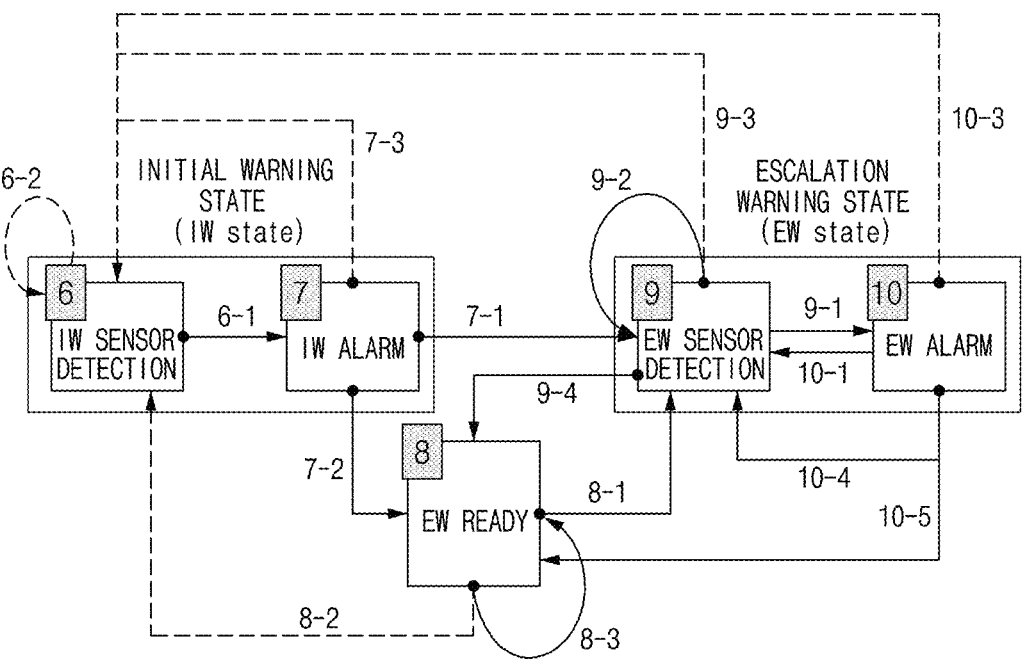
FIG. 5 is a diagram for describing a warning state transition operation to an initial sensor detection phase in a vehicle control device according to an embodiment of the present disclosure.

FIG. 5 is a diagram for describing a warning state transition operation to an initial sensor detection phase in a vehicle control device according to an embodiment of the present disclosure.

Specifically, FIG. 5 is a diagram for describing a situation in which the vehicle control device 100 re-enters the initial warning state according to a specific event during operation from an initial warning state or an escalation warning state.

The vehicle control device 100 may re-enter the IW sensor detection phase (6) according to event 6-2 in the IW sensor detection phase (6).

Here, the event 6-2 may include at least one of an event in which an alarm is output by switching from a door unlock state (Unlock) to the door lock state (Lock)—a situation in which the door is opened and closed for passengers to board—, an event in which remote ignition is ended, an event in which an alarm is output by switching from USM OFF state to USM ON state, an event in which ARMHOLD is released due to opening/closing of a trunk/frunk, an event in which an alarm is output due to the opening/closing of a door/tailgate, an event in which an alarm is output by sensor error release—a situation in which the error state of the sensor is released and re-detection is required—, an event in which the alarm flasher being driven is ended by re-entering of the door lock, and an any combination thereof.

The vehicle control device 100 may return to the IW sensor detection phase (6) according to event 7-3 in the IW alarm phase (7).

The vehicle control device 100 may return to the IW sensor detection phase (6) according to event 8-2 in the EW ready phase (8).

The vehicle control device 100 may return to the IW sensor detection phase (6) according to event 9-3 in the EW sensor detection phase (9).

The vehicle control device 100 may return to the IW sensor detection phase (6) according to event 10-3 in the EW alarm phase (10).

For example, the event 7-3, the event 8-2, the event 9-3, and the event 10-3 may include an event in which an alarm is output by switching from a USM OFF state to a USM ON state, an event in which ARMHOLD is released due to opening/closing of a trunk/frunk, an event in which an alarm is output due to the opening/closing of a door/tailgate, an event in which an alarm is output due to sensor error release—a situation in which error recovery is performed and error re-detection is required after a sensor has detected error—, and an any combination thereof.

When returning to the IW sensor detection phase (6), the vehicle control device 100 may initialize the IW warning alarm to be in a suspended state even when the IW warning alarm has already been ended.

When transitioning from the EW alarm phase (10) to the IW sensor detection phase (6), the vehicle control device 100 may initialize a counter value related to the EW warning alarm, for example, a cycle counter value.

Figure 6:
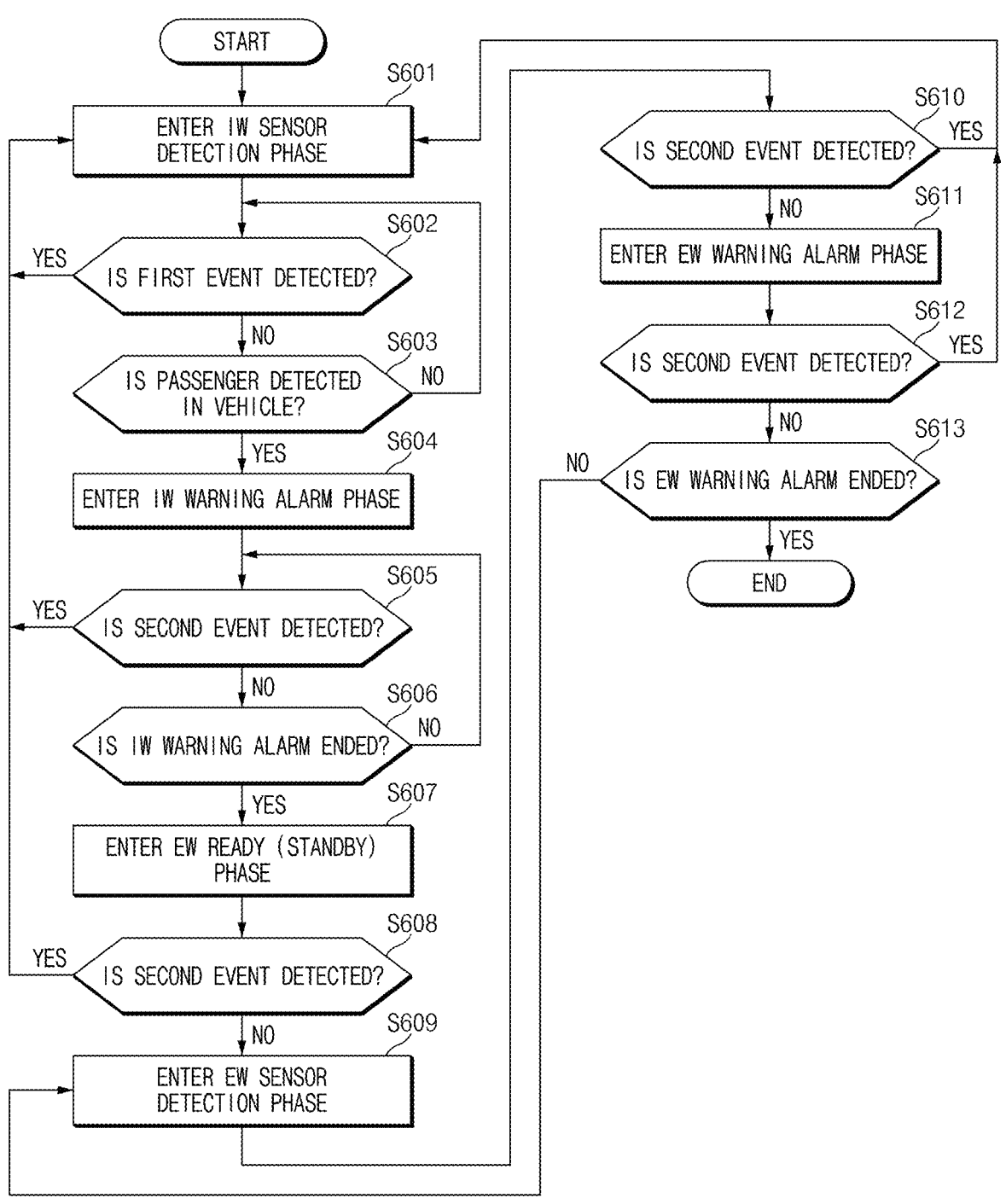
FIG. 6 is a flowchart for describing a level-wise warning alarm control operation in a vehicle control device according to an embodiment of the present disclosure.

FIG. 6 is a flowchart for describing a level-wise warning alarm control operation in a vehicle control device according to an embodiment of the present disclosure.

Referring to FIG. 6, the vehicle control device 100 may enter the IW sensor detection phase and start detecting the presence of a passenger in a vehicle (in an operation S601).

The vehicle control device 100 may determine whether a first event occurs while the IW sensor is performing detection (in an operation S602).

When the first event is detected while the IW sensor is performing detection, the vehicle control device 100 may initialize a current IW sensor detection phase and then re-enter the IW sensor sensing phase.

The vehicle control device 100 may enter an IW warning alarm phase when a passenger is detected in the vehicle through the IW sensor detection (in operations S603 to S604).

The vehicle control device 100 may detect whether a second event occurs during the IW warning alarm (in an operation S605).

When the IW warning alarm is normally ended without detecting the second event during the IW warning alarms, the vehicle control device 100 may enter the EW ready phase to detect whether the second event occurs (in operations S606 to S608).

On the other hand, when the second event is detected during the IW warning alarm, the vehicle control device 100 may initialize the IW warning alarm and return to the IW sensor detection phase.

When the second event does not occur in the EW ready phase, the vehicle control device 100 may enter the EW sensor detection phase (in an operation S609).

On the other hand, when the second event is detected in the EW ready phase, the vehicle control device 100 may initialize the IW warning alarm to be in a suspended state and return to the IW sensor detection phase.

When the second event is not detected in the EW sensor detection phase, the vehicle control device 100 may enter the EW sensor detection phase to detect whether the second event occurs (in operations S610 to S611).

On the other hand, when the second event is detected in the EW sensor detection phase, the vehicle control device 100 may initialize the EW sensor and return to the IW sensor detection phase.

The vehicle control device 100 may enter the EW warning alarm phase when the second event is not detected in the EW sensor detection phase and a passenger is detected in the vehicle.

When the second event is detected in the EW warning alarm phase, the vehicle control device 100 may initialize the EW warning alarm and the IW warning alarm and return to the IW sensor detection phase (in an operation S612).

The vehicle control device 100 may end the EW warning alarm and a system and enter a sleep mode based on the EW warning alarm reaching a preset maximum cycle (in an operation S613).

As described above, the vehicle control device 100 may initialize an existing warning alarm and re-enter the IW sensor detection phase when a specific event (for example, the first and second events) occurs during the warning alarm phase.

A detailed description of the first and second events is replaced with the description of FIGS. 1 to 5 above.

Figure 7:
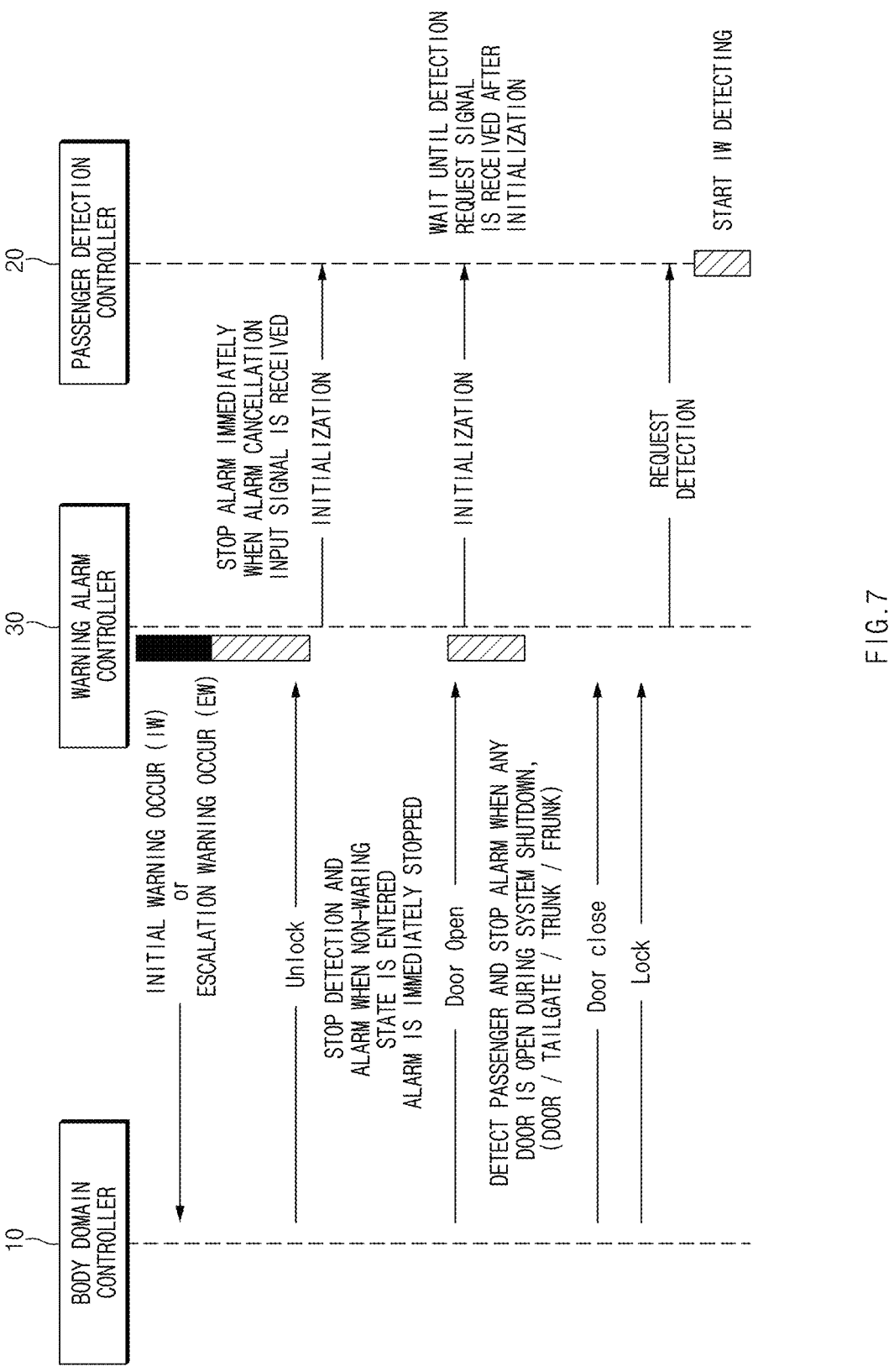
FIG. 7 is a diagram for describing a signal flow between controllers in a vehicle control device according to an embodiment of the present disclosure.

FIG. 7 is a diagram for describing a signal flow between controllers in a vehicle control device according to an embodiment of the present disclosure.

Referring to FIG. 7, the warning alarm controller 30 may immediately stop a warning alarm being output when an alarm cancellation input signal is received during output of an initial warning alarm or an escalation warning alarm.

The warning alarm controller 30 may transmit an initialization command to the passenger detection controller 20 when the alarm cancellation input signal is received from the body domain controller 10. The passenger detection controller 20 may initialize a timer of a corresponding sensor in operation according to the initialization command received from the warning alarm controller and then wait until a new detection request signal is received.

For example, the alarm cancellation input signal may include an unlock signal and a door open signal, but is not limited thereto. In this case, a unlock command may be received from a smart key, but is not limited thereto, and may be received from a user terminal through a predetermined app.

When the warning alarm controller 30 receives a lock signal after receiving a door close signal from the body domain controller 10, the warning alarm controller 30 may transmit a predetermined detection request command for requesting the passenger detection controller 20 to detect the presence of a passenger in the vehicle.

The passenger detection controller 20 may start an IW detection according to the received detection request command.

Figure 8:
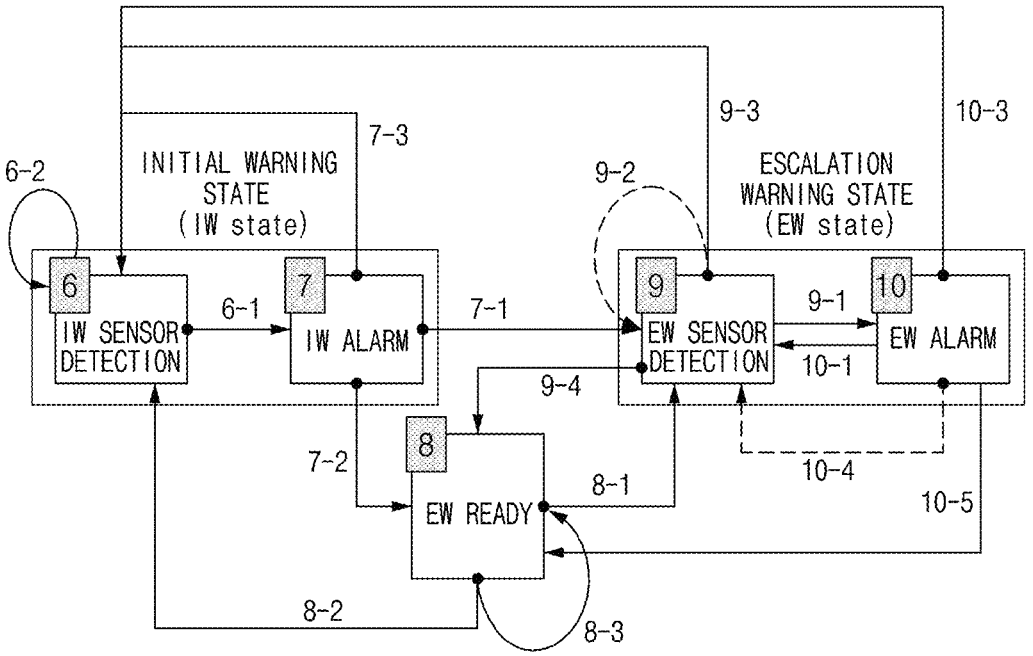
FIG. 8 is a diagram for describing state transition in an escalation warning state of a vehicle control device according to an embodiment of the present disclosure.

FIG. 8 is a diagram for describing state transition in an escalation warning state of a vehicle control device according to an embodiment of the present disclosure.

Referring to FIG. 8, state transition in an escalation warning state may largely include a case of re-entering from a current EW sensor detection phase (9) to a new EW sensor detection phase (9) according to a third event (event 9-2) and case of transitioning from the EW warning phase (10) to the EW sensor detection phase (9) according to a third event (event 10-4).

The third event according to an embodiment may include an event in which remote ignition is ended, an event in which an upper flasher is ended, an event in which an alarm flasher is ended in re-entering the door lock or any combination thereof.

The event 9-1 shown in FIG. 8 may refer to an event in which a passenger in the vehicle is detected and the EW warning alarm interval is entered, and the event 10-1 may refer to an event in which the EW warning alarm interval of a corresponding cycle is normally ended and then the EW sensor detection interval is reentered. The transition between the event 9-1 and the event 10-1 may be repeated until all EW cycles are ended.

Figure 9:
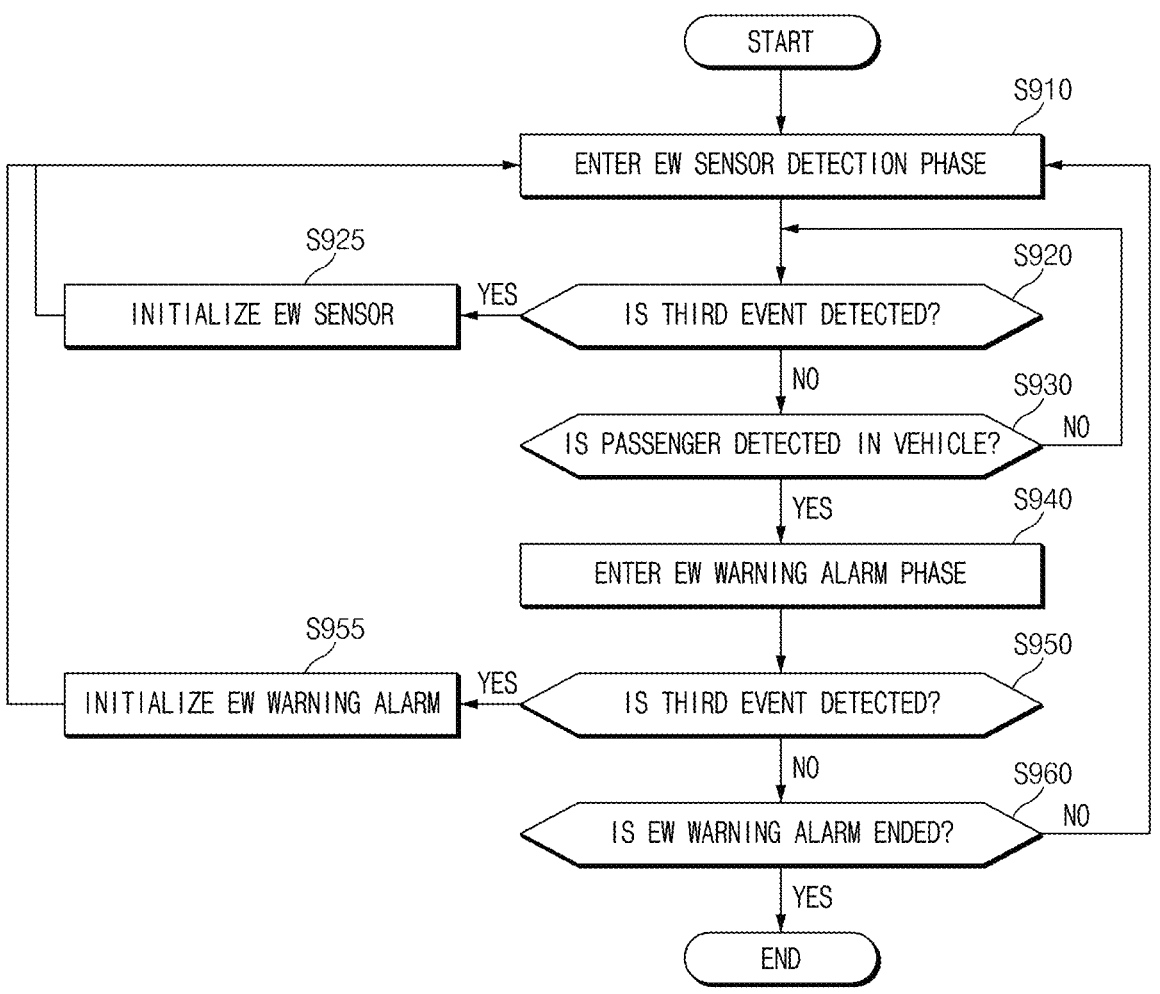
FIG. 9 is a flowchart for describing a state transition method in an escalation warning state according to an embodiment of the present disclosure.

FIG. 9 is a flowchart for describing a state transition method in an EW warning state according to an embodiment of the present disclosure.

Referring to FIG. 9, the vehicle control device may enter an EW sensor sensing phase and detect whether a third event has occurred (in operations S910 to S920).

When the occurrence of the third event is detected during the EW sensor detection interval, the vehicle control device may initialize an EW sensor (925) and then re-enter an EW sensor detection phase.

When a third event is not detected during the EW sensor detection interval and a passenger in the vehicle is detected, the vehicle control device may enter the EW warning alarm phase (in operations S930 to S940).

The vehicle control device may detect whether a third event occurs in the EW warning alarm phase (in an operation S950).

When the occurrence of the third event is detected during the EW warning alarm interval, the vehicle control device may initialize the EW warning alarm (in an operation S955) and then re-enter the EW sensor detection phase.

When the third event is not detected during the EW warning alarm interval and the EW warning alarm of the corresponding cycle is ended, the vehicle control device may whether the EW warning alarm is ended (in an operation S960). Here, whether the EW warning alarm is ended may mean whether all predefined EW cycles are normally ended.

When the third event is not detected during the EW warning alarm interval and the EW warning alarm is not ended, the vehicle control device may return to the EW sensor detection phase. In this case, it should be noted that EW warning alarm information—for example, the number of EW cycles performed up to now—is not initialized.

When the third event is not detected during the EW warning alarm interval and the EW warning alarm is ended, the vehicle control device may shut down the system and enter the sleep mode.

Figure 10:
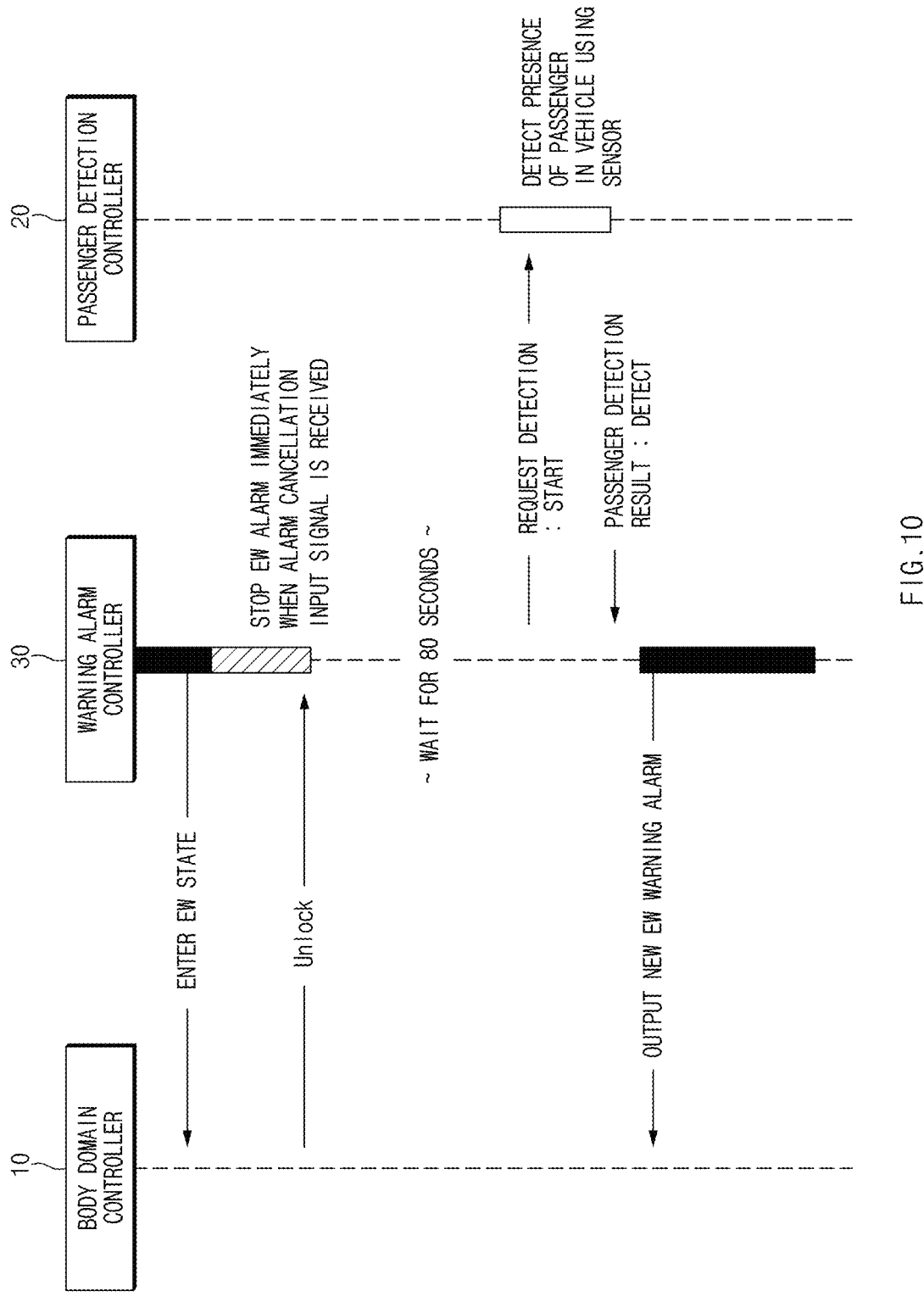
FIG. 10 is a diagram for describing a signal flow between controllers in a vehicle control device according to another embodiment of the present disclosure.

FIG. 10 is a diagram for describing a signal flow between controllers in a vehicle control device according to another embodiment of the present disclosure.

Referring to FIG. 10, the warning alarm controller 30 may enter an escalation warning state and immediately stop an EW warning alarm being output when an alarm cancellation input signal is received while outputting the EW alarm.

When the alarm cancellation input signal is received from the body domain controller 10, the warning alarm controller 30 may re-enter an EW state after waiting for a predetermined time.

For example, the alarm cancellation input signal may include an unlock signal, but is not limited thereto.

The warning alarm controller according to the embodiment may stop both passenger detection and warning alarm output when the alarm cancellation input signal is detected in a non-warning state, but this is merely one embodiment. The warning alarm controller 30 according to another embodiment may perform control to continuously perform passenger detection in spite of the non-warning state according to a warning level—for example, in an escalation warning state.

The warning alarm controller may transmit a detection request signal for requesting detection of a passenger in the vehicle to the passenger detection controller 20 during EW standby.

The passenger detection controller 20 may detect the presence or absence of a passenger in the vehicle by driving a corresponding sensor according to the received detection request signal.

The passenger detection controller 20 may transmit a passenger detection result signal including information indicating that a passenger in the vehicle has been detected to the warning alarm controller 30.

The warning alarm controller 30 may output a new EW warning alarm according to a passenger detection result signal indicating that a passenger has been detected.

Figure 11:
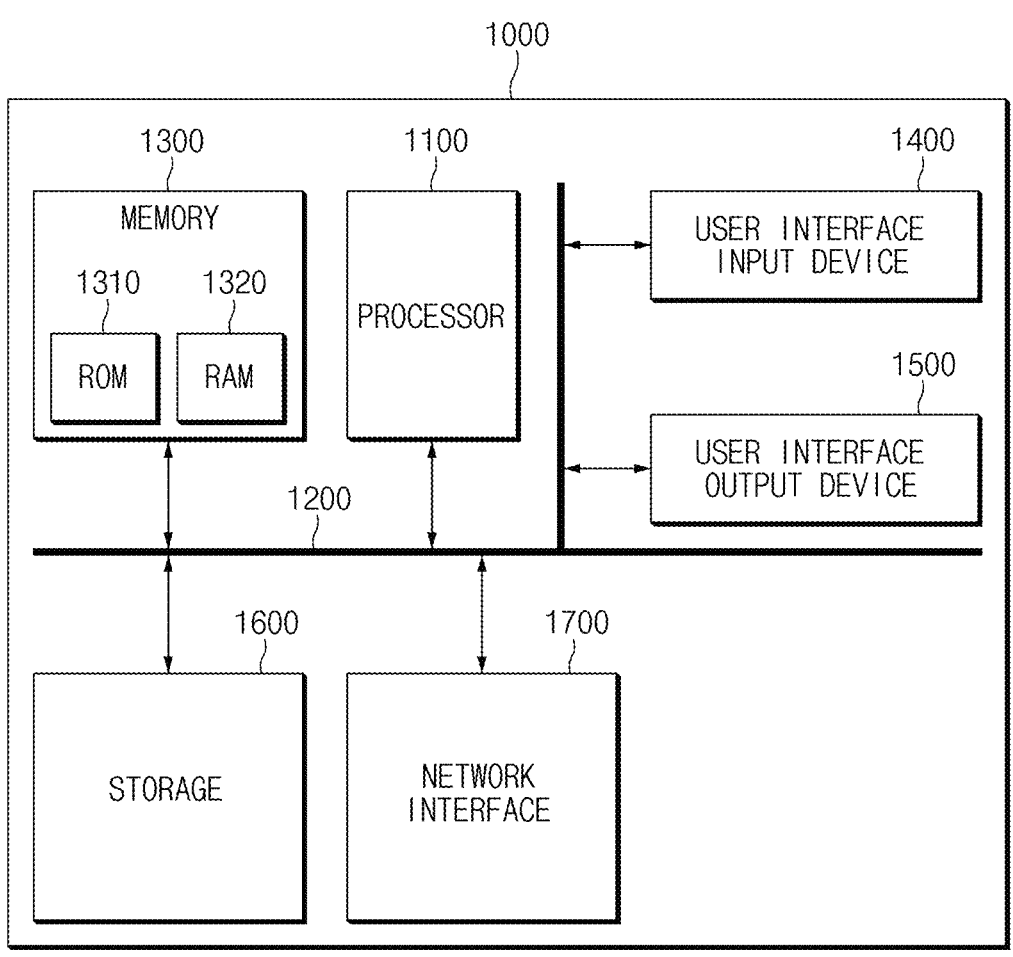
FIG. 11 illustrates a computing system according to an embodiment of the present disclosure.

FIG. 11 illustrates a computing system according to an embodiment of the present disclosure.

A computing system 1000 according to the embodiment may be applied to the vehicle control device 100 described above with reference to FIGS. 1 to 10.

Referring to FIG. 11, the computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a Read Only Memory (ROM) and a Random Access Memory (RAM).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The above description is merely illustrative of the technical idea of the present disclosure, and various modifications and variations may be made without departing from the essential characteristics of the present disclosure by those having ordinary skill in the art to which the present disclosure pertains.

Accordingly, the embodiment disclosed in the present disclosure is not intended to limit the technical idea of the present disclosure but to describe the present disclosure, and the scope of the technical idea of the present disclosure is not limited by the embodiment. The scope of protection of the present disclosure should be interpreted by the following claims, and all technical ideas within the scope equivalent thereto should be construed as being included in the scope of the present disclosure.

The present disclosure is capable of providing the vehicle control method and the vehicle control device capable of efficiently controlling a level-wise warning alarm.

In addition, the present disclosure is capable of providing a vehicle control adaptively transitioning between warning alarm levels according to various events, and a device and system therefor.

In addition, the present disclosure is capable of providing a vehicle control method and vehicle control device by defining detailed conditions for warning state transition in a vehicle control device for detecting a remaining occupant in a vehicle and outputting a warning alarm in a level-wise manner when a driver leaves the vehicle after vehicle ignition is turned off.

In addition, various effects may be provided that are directly or indirectly understood through the disclosure.

Hereinabove, although the present disclosure has been described with reference to exemplary embodiments and the accompanying drawings, the present disclosure is not limited thereto, but may be variously modified and altered by those having ordinary skill in the art to which the present disclosure pertains without departing from the spirit and scope of the present disclosure.

What is claimed is:

1. A vehicle control method, comprising:

entering an initial warning state based on a door being locked in a pre-warning state to output a first warning alarm for a first time interval after an ignition of a vehicle is turned off; and entering an escalation warning state based on end of the first warning alarm and outputting a second warning alarm for a second time interval, wherein the first and second warning alarms are output based on detection of a passenger in the vehicle, wherein the first time interval includes a first active interval in which the first warning alarm is repeatedly output a first number of times at first intervals of time; and a first standby interval for waiting for a second time after the first active interval, wherein the second time interval includes a plurality of cycles, wherein each cycle includes:

a second active interval in which the second warning alarm is repeatedly output a second number of times at the first intervals of time; and a second standby interval for waiting for a third time after the second active interval, and wherein the second number of times is greater than the first number of times, and the first standby interval is longer than the second standby interval.

2. The vehicle control method of claim 1, wherein the second time interval is longer than the first time interval.

3. The vehicle control method of claim 1, further comprising:

entering the escalation warning state after the first standby interval.

4. The vehicle control method of claim 1, wherein each of the initial warning state and the escalation warning state includes a detection interval which is a time for detecting presence or absence of the passenger in the vehicle using a sensor provided in the vehicle.

5. The vehicle control method of claim 4, further comprising:

transitioning to the initial warning state based on occurrence of a first event in the escalation warning state, wherein the first event includes at least one of:

a first alarm event according to error release after a sensor error is detected;

a second alarm event according to unlock of the door;

a third alarm event according to opening or closing of a tailgate of the vehicle;

a fourth alarm event according to opening or closing of a trunk or frunk of the vehicle; or a fifth alarm event according to a transition from a User Setting Menu (USM) OFF state to a USM ON state.

6. The vehicle control method of claim 5, further comprising:

reentering the initial warning state to re-detect the passenger in the vehicle based on occurrence of a second event in the initial warning state, wherein the second event includes at least one of:

the first to fifth alarm events;

a sixth alarm event according to remote ignition end; or a seventh alarm event according to end of an alarm flasher when the door is locked again.

7. The vehicle control method of claim 6, further comprising:

reentering the escalation warning state to re-detect the passenger in the vehicle based on occurrence of a third event in the escalation warning state, wherein the third event includes at least one of:

an alarm event according to remote ignition end;

an alarm event according to upper flasher end; or an alarm event according to end of an alarm flasher when the door is locked again.

8. The vehicle control method of claim 1, further comprising:

counting the plurality of cycles in the escalation warning state and initializing counting for the plurality of cycles based on transition from the escalation warning state to the initial warning state or re-entry into the escalation warning state.

9. A vehicle control device comprising:

a body domain controller configured to detect operation for a door switch;

a passenger detection controller configured to detect presence or absence of a passenger in a vehicle based on sensing information received from a sensor; and a warning alarm controller configured to control a level-wise warning alarm when the passenger is detected in the vehicle, wherein the warning alarm controller is configured to:

enter an initial warning state based on a door being locked in a pre-warning state to output a first warning alarm for a first time interval after a vehicle ignition is turned off; and enter an escalation warning state based on end of the first warning alarm and output a second warning alarm for a second time interval, wherein the first and second warning alarms are output based on detection of the passenger in the vehicle, wherein the first time interval includes:

a first active interval in which the first warning alarm is repeatedly output a first number of times at first intervals of time; and a first standby interval for waiting for a second time after the first active interval, wherein the second time interval includes a plurality of cycles, wherein each cycle includes:

a second active interval in which the second warning alarm is repeatedly output a second number of times at the first intervals of time; and a second standby interval for waiting for a third time after the second active interval, and wherein the second number of times is greater than the first number of times, and the first standby interval is longer than the second standby interval.

10. The vehicle control device of claim 9, wherein the second time interval is longer than the first time interval.

11. The vehicle control device of claim 9, wherein the warning alarm controller is configured to enter the escalation warning state after the first standby interval.

12. The vehicle control device of claim 9, wherein each of the initial warning state and the escalation warning state includes a detection interval which is a time for detecting presence or absence of the passenger in the vehicle using the sensor, and wherein the sensor includes at least one of a laser sensor, an infrared sensor, a camera sensor, or a pressure sensor.

13. The vehicle control device of claim 12, wherein the warning alarm controller is configured to transition to the initial warning state based on occurrence of a first event in the escalation warning state, and wherein the first event includes at least one of:

a first alarm event according to error release after a sensor error is detected;

a second alarm event according to unlock of the door;

a third alarm event according to opening or closing of a tailgate of the vehicle;

a fourth alarm event according to opening or closing of a trunk or frunk of the vehicle; or a fifth alarm event according to a transition from a User Setting Menu (USM) OFF state to a USM ON state.

14. The vehicle control device of claim 13, wherein the warning alarm controller is configured to reenter the initial warning state to re-detect the passenger in the vehicle based on occurrence of a second event in the initial warning state, wherein the second event includes at least one of:

the first to fifth alarm events;

a sixth alarm event according to remote ignition end; or a seventh alarm event related to end of an alarm flasher when the door is locked again.

15. The vehicle control device of claim 9, wherein the warning alarm controller is configured to reenter the escalation warning state to allow the passenger detection controller to re-detect the passenger in the vehicle based on occurrence of a third event in the escalation warning state, wherein the third event includes at least one of an alarm event according to remote ignition end;

an alarm event according to upper flasher end; or an alarm event according to end of an alarm flasher when the door is locked again.

16. The vehicle control device of claim 9, wherein the warning alarm controller is configured to count the plurality of cycles in the escalation warning state and initialize counting for the plurality of cycles based on transition from the escalation warning state to the initial warning state or re-entry into the escalation warning state.

\* \* \* \* \*